United States Patent
Hoffman et al.

(12) 
(10) Patent No.: US 12,515,881 B2
(45) Date of Patent: Jan. 6, 2026

(54) AUTOMATED STORAGE AND RETRIEVAL SYSTEM WITH MICROCLIMATE-CONTROLLED RECEPTACLES

(71) Applicant: Dematic Corp., Grand Rapids, MI (US)

(72) Inventors: Stephen E. Hoffman, Grand Rapids, MI (US); William R. Boer, Wayland, MI (US); Matthew Inbody, Grand Rapids, MI (US); Alexander Dale, Etobicoke (CA)

(73) Assignee: Dematic Corp., Grand Rapids, MI (US)

( * ) Notice: Subject to any disclaimer, the term of this patent is extended or adjusted under 35 U.S.C. 154(b) by 528 days.

(21) Appl. No.: 18/161,421

(22) Filed: Jan. 30, 2023

(65) Prior Publication Data

US 2023/0242344 A1 Aug. 3, 2023

Related U.S. Application Data

(60) Provisional application No. 63/304,917, filed on Jan. 31, 2022.

(51) Int. Cl.
*B65G 1/137* (2006.01)
*B65G 1/04* (2006.01)
(Continued)

(52) U.S. Cl.
CPC ......... *B65G 1/1378* (2013.01); *B65G 1/0421* (2013.01); *F25D 15/00* (2013.01); *F25D 17/06* (2013.01); *G05B 15/02* (2013.01)

(58) Field of Classification Search
CPC ..... B65G 1/1378; B65G 1/0421; F25D 15/00; F25D 17/06; G05B 15/02
See application file for complete search history.

(56) References Cited

U.S. PATENT DOCUMENTS 8,983,647 B1 * 3/2015 Dwarakanath ....... G05D 1/0297
                                                          700/216
10,819,126 B2 10/2020 Hognaland et al.
(Continued)

FOREIGN PATENT DOCUMENTS

| CN | 109502220 A | 3/2019 |
| CN | 110884819 A | 3/2020 |

(Continued)

*Primary Examiner* — Kyle O Logan
(74) *Attorney, Agent, or Firm* — Gardner, Linn, Burkhart & Ondersma LLP

(57) ABSTRACT

An automated warehouse system and method are provided for controlling the internal microclimate of receptacles within a warehouse or order fulfilment facility. The system provides independent environmental condition monitoring and regulation for each tote. The system enables individual totes to be maintained at adequate or substantially ideal conditions, independent of its position within a storage system or the environmental conditions of adjacent totes in the storage system. The totes may include self-contained environmental control systems and/or the storage system may include environmental control inputs to adjust or maintain the environmental conditions within a particular tote. The system is operable to monitor and control the microclimate of a tote while it is stored at a storage location within the storage system or in a buffer, and may be operable to monitor and/or control the microclimates of the totes while they travel throughout the system.

19 Claims, 3 Drawing Sheets

(51) Int. Cl.
  *F25D 15/00* (2006.01)
  *F25D 17/06* (2006.01)
  *G05B 15/02* (2006.01)

(56) References Cited

U.S. PATENT DOCUMENTS

| | | |
|---|---|---|
| 2011/0202170 A1 | 8/2011 | Dawes et al. |
| 2013/0166060 A1* | 6/2013 | Irwin ........................ G07F 7/08 |
| | | 700/214 |
| 2014/0058554 A1* | 2/2014 | Janet ....................... G07F 11/64 |
| | | 700/214 |
| 2020/0005229 A1* | 1/2020 | Durkee .................... B65G 1/06 |
| 2020/0071076 A1* | 3/2020 | Fosnight .............. G05D 1/0276 |
| 2020/0216253 A1* | 7/2020 | Tanabe ............... B65D 81/3823 |
| 2020/0317445 A1 | 10/2020 | Schultz et al. |
| 2020/0393186 A1* | 12/2020 | Horii .................... F25D 17/045 |
| 2021/0199353 A1 | 7/2021 | Edwards et al. |
| 2022/0154992 A1* | 5/2022 | Siddiqui ............... F28D 20/021 |
| 2023/0242344 A1* | 8/2023 | Hoffman ................. B65G 1/02 |
| | | 700/214 |
| 2023/0267404 A1* | 8/2023 | Villalobos ............ B65D 88/745 |
| | | 705/332 |

FOREIGN PATENT DOCUMENTS

| | | |
|---|---|---|
| EP | 3844084 A2 | 7/2021 |
| JP | 2009050076 A | 3/2009 |
| WO | 2018073392 A1 | 4/2018 |
| WO | 2021148642 A1 | 7/2021 |
| WO | 2021257563 A2 | 12/2021 |
| WO | 2022123533 A1 | 6/2022 |
| WO | 2022258451 A1 | 12/2022 |

* cited by examiner

AUTOMATED STORAGE AND RETRIEVAL SYSTEM WITH MICROCLIMATE-CONTROLLED RECEPTACLES

CROSS REFERENCE TO RELATED APPLICATION

The present application claims priority of U.S. provisional application Ser. No. 63/304,917 filed Jan. 31, 2022, which is hereby incorporated herein by reference it its entirety.

FIELD OF THE INVENTION

The present invention is directed to automated storage systems, and in particular temperature and environmentally controlled storage systems.

BACKGROUND OF THE INVENTION

Many consumer products require specialized environments for warehousing and storage. Automated storage and retrieval systems take full advantage of building height by using various lift, transport and storage mechanisms and technology to increase the number of locations, and quantity of items that can be stored by maximizing the available cube of the building. Typical automated storage and retrieval equipment commonly store all items requiring a specialized storage environment in a large area or environment that is suited for those types of good. For example, frozen items are typically stored in automated storage and retrieval systems within a freezer building or self-contained freezer compartment within a larger building. Accordingly, it is common for vertical space in warehouses and distribution centers is to be underutilized because the specialized areas or environments for particular groupings of goods are often too large or only occasionally filled to capacity.

SUMMARY OF THE INVENTION

The present invention provides an automated warehouse system with an automated storage and retrieval solution that includes independent and/or individually climate-controlled storage receptacles or totes and a method for monitoring and controlling the microclimate within each tote. A microclimate is the climate of a very small or restricted area (e.g. an individual tote), especially when this differs from the climate of the surrounding area (e.g. a surrounding storage system). The system includes a warehouse control system that is operable to control the microclimates of each tote as well as storage, decant, and order fulfilment operations of goods within the facility. The system is well-suited for operation within an ambient environment, thereby substantially reducing or eliminating strain on both equipment and workers that is commonly experience in low temperature settings and other harsh environment, such as low oxygen environments. The system provides flexibility as the microclimate environment inside each individual tote can be adjusted or completely altered without affecting the goods in other totes in the system.

An automated warehouse system in accordance with an aspect of the present invention for storage of goods at different temperatures and having a warehouse control system controlling the system comprises an automated storage and retrieval system comprising a storage rack defining a plurality of storage locations and a plurality of storage receptacles. The storage receptacles are configured to be stored at storage locations in the automated storage and retrieval system, and are each individually addressable by the warehouse control system. The warehouse control system is operable to monitor, maintain and adjust the environmental conditions of each of the storage receptacles stored in the automated storage and retrieval system based on information received regarding the corresponding one of the storage receptacles, the warehouse control system is operable to separately maintain and adjust the environment conditions of each of the storage receptacles.

In accordance with a particular embodiment, the warehouse system comprises a communication network disposed throughout the automated storage and retrieval system and is selectively engageable by one of said storage receptacles at each of said storage locations, wherein each of the storage receptacles is configured to selectively couple with the communication network when stored at one of said storage locations. The warehouse control system is operable to adjust the environmental conditions of each of the storage receptacles via a connection between the communication network and each of the storage receptacles. In a particular embodiment, the communication network is configured to provide power to the storage receptacles at the storage locations. In a further particular aspect, each of the storage receptacles is operable to monitor and regulate its environmental conditions when the storage receptacle is coupled with the communication network.

Still further, the automated warehouse system is operable to direct order fulfilment operations in a manner that holds at least some of the storage receptacles containing required goods for a particular order until an order container or containers are available at an order fulfilment workstation to accommodate all of the required goods for that particular order. For example, the automated warehouse system may comprise a buffer configured to store a plurality of storage receptacles either once they have been released from the automated storage and retrieval system or after a decant operation.

The automated warehouse system may further comprise a fluid distribution system that is selectively engageable by the storage receptacles at each of the storage locations when stored at the storage locations, where the warehouse control system is operable to adjust the environmental conditions of each of the storage receptacles via a connection between the fluid distribution system and each of the storage receptacles. The fluid distribution system may be configured to supply one of a gas or air to the storage receptacles, such as a refrigerated gas or air.

The automated warehouse system may be located in an ambient environment, and the automated storage and retrieval system may be configured as a grid storage system, an aisle based storage system, or a carousel based storage system. Still further, the control system is operable to control the temperature, humidity, and/or gas levels within the storage receptacles The warehouse control system is operable to direct decant operations of inbound goods into storage receptacles in a manner that provides a storage receptacle or receptacles for decanting having adequate storage volume available to receive an entirety of an inbound case of goods such that the entirety of the goods are stored at identical environmental conditions within the same one or ones of said storage receptacles. Still further, the warehouse control system is operable to direct order fulfilment operations of goods stored in two or more storage receptacles in a manner that holds all of the storage receptacles containing required goods for a particular order until an order container or containers are available at an order fulfilment workstation to accommodate all of the required goods for that particular order.

A method for controlling microclimates inside of individual storage receptacles within an automated warehouse system having a warehouse control system in accordance with an aspect of the present invention comprises storing a plurality of storage receptacles in an automated storage and retrieval system, monitoring the environmental conditions within each of the storage receptacles with the warehouse control system, which is operable to individually address each of the storage receptacles via a communication network disposed throughout the automated storage and retrieval system, and regulating the environmental conditions within particular ones of the storage receptacles if the storage receptacles require adjustment of their respective environmental conditions based on the monitoring to meet the requirements for the goods stored within the particular storage receptacles.

These and other objects, advantages, purposes and features of this invention will become apparent upon review of the following specification in conjunction with the drawings.

DESCRIPTION OF THE PREFERRED EMBODIMENTS

Figure 1:
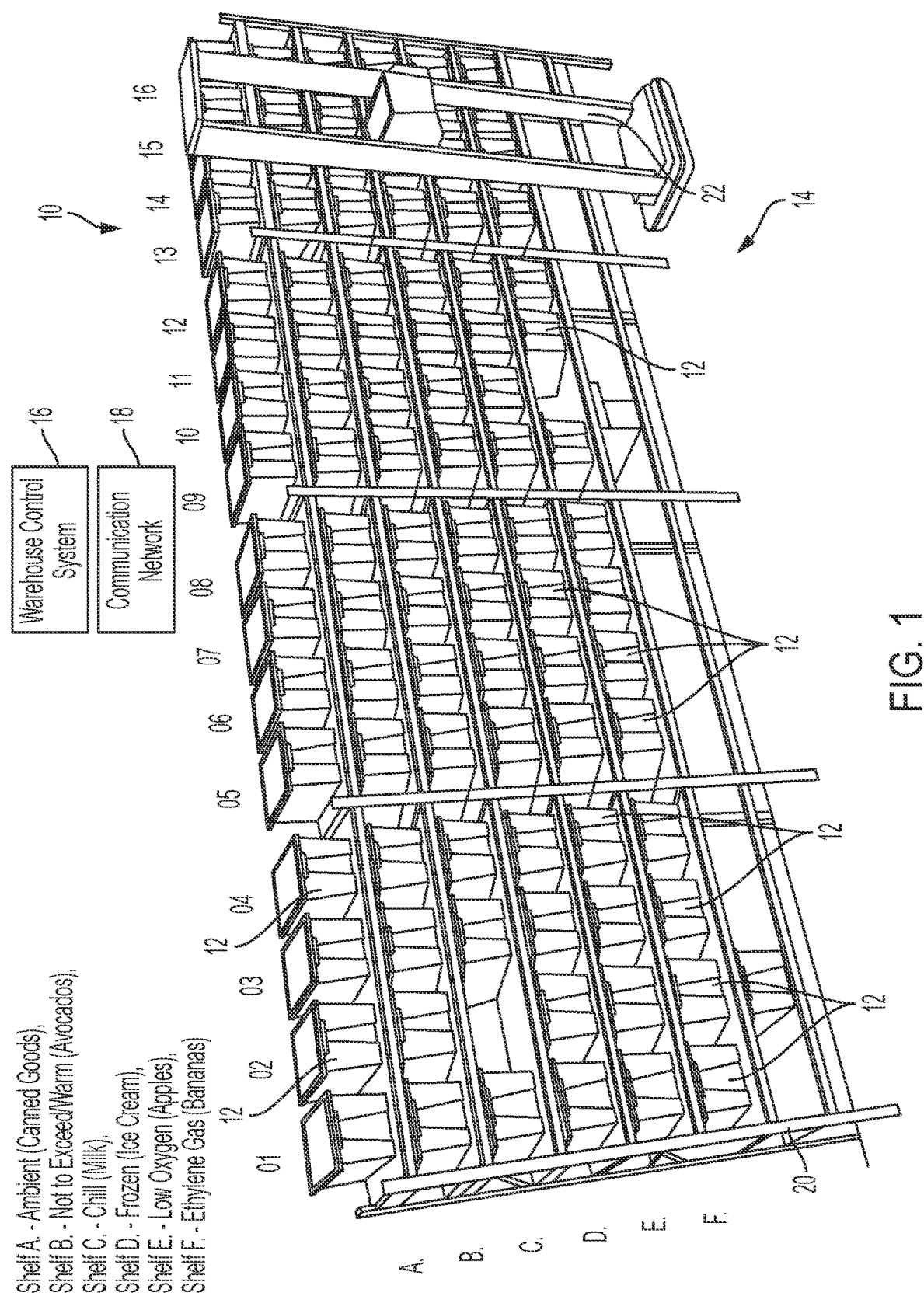
FIG. 1 is a perspective view of an automatic storage and retrieval system of an automated warehouse system for controlling microclimates of individual storage receptacles, in accordance with the present invention.
Figure 2:
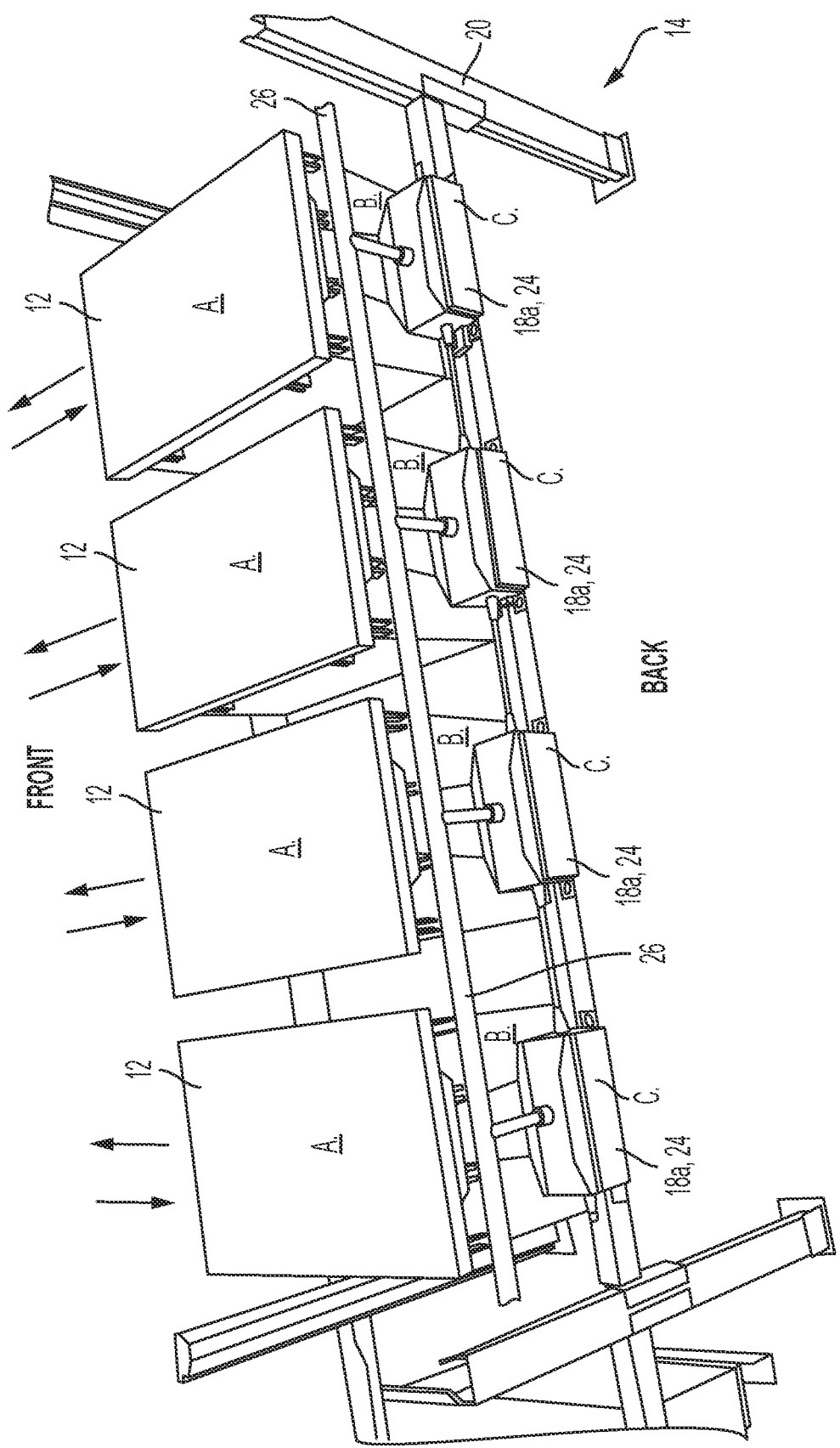
FIG. 2 is a perspective view of portion of the automatic storage and retrieval system of FIG. 1, depicting storage receptacles coupled to a communication and control network, in accordance with the present invention.
Figure 3:
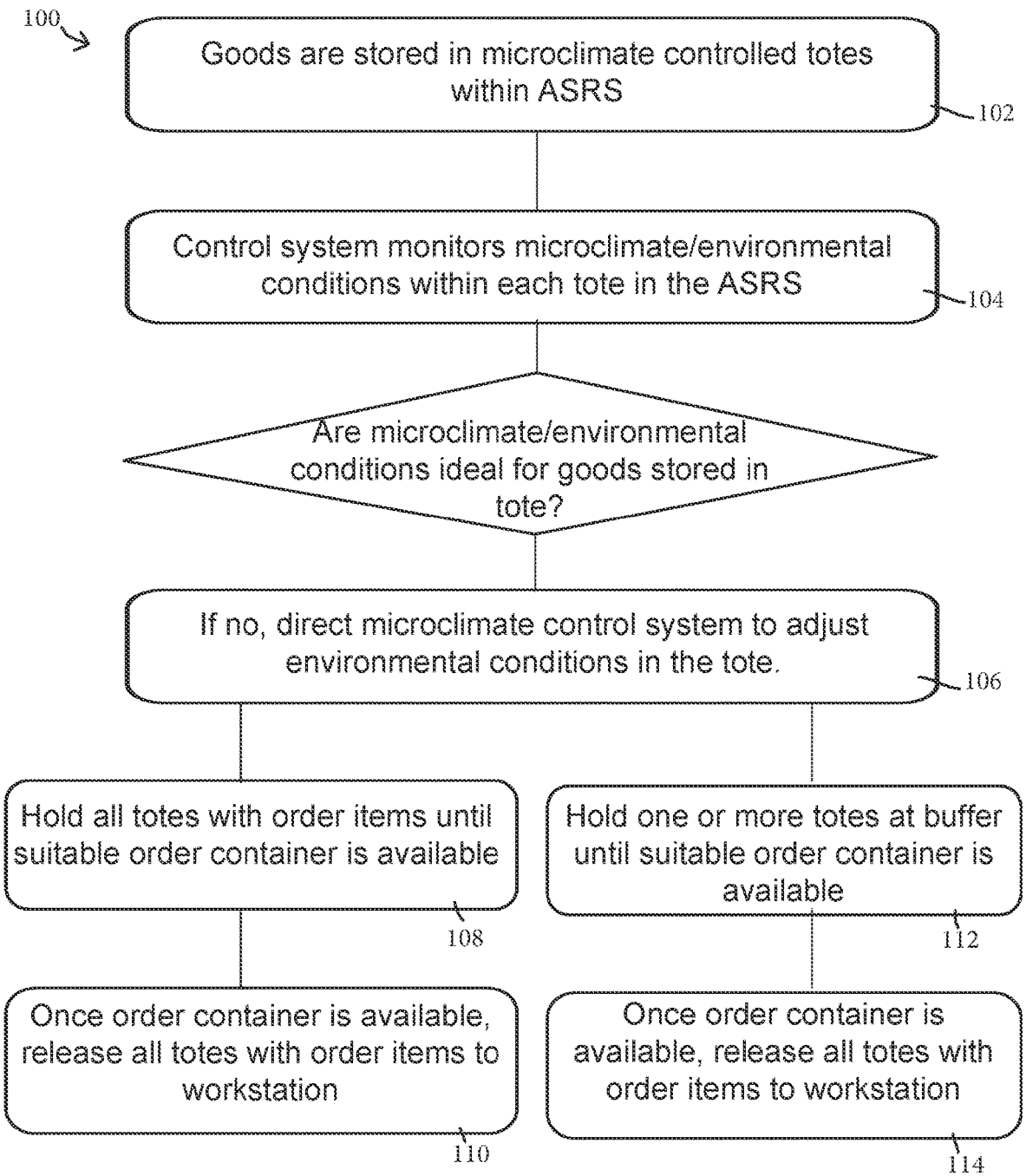
FIG. 3 is a diagram of a method for controlling the microclimate for microclimate-controlled storage receptacles within an automated warehouse system, in accordance with the present invention.

Referring now to the drawings and the illustrative embodiments depicted therein, an automated warehouse system 10 and method 100 are provided for actively monitoring and controlling or regulating the microclimate within a microclimate-controlled tote or receptacle 12 (FIGS. 1-3). The system 10 includes an automated storage and retrieval system (ASRS) 14 for storing, monitoring, controlling, and charging the totes 12. The system includes a warehouse control system 16 and a communication network 18 that is distributed throughout the system 10. The system 10 and method 100 may be operable for both controlling the ASRS 14 as well as buffering totes 12 based on order fulfilment operation requirements of an order fulfilment workstation in communication with the ASRS 14. The system 10 and method 100 enable real-time monitoring of the environmental conditions within totes 12. Real-time monitoring enables the capture of key data elements as it pertains to the type and quantity of goods stored in a particular tote 12. Such data elements are utilized for real-time and active microclimate-control of each individual tote 12, which enables micro adjustment and regulation of the totes 12 to ensure that the goods within a particular tote are maintained at adequate or ideal environmental conditions.

Referring now to the illustrative embodiment of FIGS. 1 and 2, an automated warehouse system 10 is provided for the storage of goods at different temperatures within an order fulfilment facility. The system 10 includes an ASRS 14 having a storage rack 20 with multiple rack levels each having and defining multiple storage locations for the storage of totes 12. The ASRS 14 may optionally include two or more storage racks 20, with aisles between the storage racks and robotic shuttles operating in the aisles to store and retrieve the totes 12 from the storage locations. The ASRS 14 includes a lift 22 for transporting totes 12 to the different levels of the storage rack 20. The lift 22 also transfers items from the ASRS 14 to a downstream process, such as a conveyer in communication with an order fulfillment and/or decant workstation. The ASRS 14 may be located in an ambient environment, such as a warehouse facility without cold storage functionality, while each of the totes 12 are maintained at an appropriate internal temperature for the goods stored within. While the ASRS 14 is described above and illustrated in FIGS. 1 and 2 as an aisle based storage system, it will be appreciated that the system 10 may utilize a grid array storage system, a carousel based storage system, or any commonly known storage system that is operable to handle and store storage receptacles or totes 12.

The system 10 includes the warehouse control system 16 which has a computer for controlling the operation of the system 10, including directing storage, decant, and order fulfilment operations of goods within the facility. The totes 12 are each independently addressable by the warehouse control system 16 and are each operable to adjust or regulate the microclimate in the interior of the tote 12. That is, control system 16 is operable for use in monitoring and controlling the microclimate of each tote 12 by the given storage location for the tote 12, with system 10 being able to control the microclimate based on the known contents of the tote 12 by system 10. Each tote 12 may include an independent, integrally installed climate control system for regulating and adjusting the environmental conditions within the tote, such as for adjusting the temperature, humidity, and gas levels (e.g. oxygen or ethylene concentrations) within the tote 12, such as for preserving freshness of frozen or fresh produce, for example, such as via power supplied to the tote 12 via a power interface 24 at the storage locations of the ASRS 14, where the power interface 24 may engage with the tote 12 or provide inductive power or the like. Optionally, environmental control inputs may be provided throughout the ASRS 14 to provide inputs to the totes 12 stored at storage locations in the ASRS 14. For example, as best illustrated in FIG. 2, the communication network 18 distributed throughout the ASRS 14 includes data interfaces 18a at each storage location of the ASRS 14 such as for monitoring the microclimate of the totes 12. A power interface 24 is provided along with the data interface 18a to provide electricity inputs to the totes 12 in order to energize their climate control system and/or charge an onboard battery of the tote 12. A fluid distribution system is provided with the ASRS 14, in the form of an air/gas delivery network 26 comprising piping, for delivering fluids to be input into the totes 12. For example, a tote 12 containing fresh bananas may require additional ethylene gas to aid in ripening the bananas and the ethylene gas may be transported via the delivery network 26 and input into a tote 12 stored at a storage location. The environmental control inputs may utilize thermoelectric pumps, forced ventilation, vapor-compression refrigeration, refrigerants, gas control mechanisms, and the like to supply required inputs to the totes 12 based on the requirements of the facility and the goods stored therein. As understood from and shown in the illustrated embodiment of FIG. 2, the totes comprise a base container B with an upper lid A, with the automated storage and retrieval system including interfaces C at each of the storage locations, where the interfaces C engage with a side of the container B. In the illustrated embodiment the interfaces C include data interfaces 18*a* and power interfaces 24, as well as provide an interface for supply of air/gas via the air/gas delivery system 26. For example, the data interfaces 18*a* and power interfaces 24 may engage with the container B via conventional plug connections between the container B and interfaces C. Likewise, conventional air/gas couplings may be used for engagement between containers B and interfaces C for supply of air/gas via delivery system 26.

Totes 12 may be stored in groups within the ASRS 14, with different groups stored at different rack levels corresponding to a particular temperature or environment characteristic. For example, one group of totes 12 at a rack level may be maintained at an ambient temperature (see rack level A in FIG. 1), another group of totes 12 at a rack level may be maintained at a warm temperature not to exceed a specified temperature (see rack level B of FIG. 1), another group of totes 12 at a rack level may be maintained at a chilled temperature (see rack level C of FIG. 1), another group of totes 12 at a rack level may be maintained at a frozen temperature (see rack level D of FIG. 1), another group of totes 12 at a rack level may be maintained at a low oxygen level (see rack level E of FIG. 1), and another group of totes 12 at a rack level may have ethylene gas input into the totes 12 via the fluid delivery system 26 (see rack level E of FIG. 1).

The communication network 18 is selectively engageable by a tote 12 when it is stored at a storage location. As such, the tote 12 connects to or interfaces with the communication network 18 when it is stored in the ASRS 14 and information from the totes 12 can be transmitted to the warehouse control system 16 via the communication network 18. The warehouse control system 16 is operable to monitor and maintain or adjust the environmental conditions of each of the totes 12 independently based on information received via the communication network 18 from the corresponding tote 12, such as the temperature and/or humidity. In other words, the warehouse control system 16 is operable to monitor and maintain or adjust the environment conditions of each of the totes 12 at different levels.

The totes 12 may only be addressable by the warehouse management system 16 while they are stored at a storage location in the ASRS 14 such that their microclimates may only be monitored and/or adjusted while stored. In other words, as a tote 12 is traveling or in motion within the system 10, it is decoupled from environmental control and the data interface 18*a*, power interface 24, and the fluid delivery system 26 are unable to input into the totes 12. As described in further detail below, the system 10 may include a holding buffer having environmental control inputs to monitor and regulate microclimates of totes 12 that are decoupled from the ASRS 14, such as totes containing completed orders for a customer order that will be retrieved by the customer in an ensuing period, for example. However, it will be appreciated that the totes 12 may be operable to regulate and monitor their environmental conditions independent of the ASRS 14 and environmental control inputs when the storage receptacle is de-coupled from the ASRS 14 or traveling through the system 12, such as with wireless communication systems between the warehouse control system 16 and the individual totes 12. An example of a tote 12 that is independently operable to control its microclimate may include structure and function similar to the storage and transportation cooler disclosed in U.S. Pat. App. Pub. No. 2021/0199353A1, published Jul. 1, 2021 by Phononic, Inc. of Durham, NC, the disclosure of which is hereby incorporated herein by reference in its entirety. As such, the totes 12 may comprise a container with a lid and include active thermoelectric cooling, such as a thermoelectric heat pump operable to cool the interior of the tote 12, and may include control logic enabled as an application programming interface (API) to provide remote temperature monitoring/controlling.

The warehouse control system 16 is operable to control and direct decant operations of inbound goods (e.g. vendor cases) into totes 12 at a decant workstation prior to be input and stored in the ASRS 14. For example, the warehouse control system 16 may direct the system 10 to provide a tote 12 to the decant workstation that has adequate storage volume available to receive the entirety of an inbound case of goods. As such, the entirety of the goods can be stored at identical environmental conditions within the same one or a grouping of the same totes 12. The warehouse control system 16 is operable to control and direct order fulfilment operations of inventory goods from the ASRS 14 to an order fulfilment workstation. For example, for orders requiring goods stored in two or more of the totes in the ASRS 14, the warehouse control system 16 may direct the system 10 to hold all of the totes 12 containing required goods for that order within the ASRS 14 until an order container is or multiple containers (if necessary) are available at the order fulfilment workstation to accommodate all of the required goods for that order.

The automated warehouse system 10 may include a buffer to store totes 12 temporarily either once they have been released from the ASRS 14 or after they have been filled and released from a decant workstation. The communication network 18 is connected to the buffer to monitor the microclimate, environmental conditions of the totes 12 in the buffer. Environmental control inputs may also be connected to the buffer to provide inputs to totes 12 held in the buffer. For example, the buffer may be configured similar to the ASRS 14, such as at a smaller scale. The warehouse control system 16 may direct the system 10 to hold one or more totes 12 containing required goods for a particular order at the buffer until an order container or multiple containers are available at the order fulfilment workstation to accommodate all of the required goods for that order. In one exemplary embodiment, the buffer may receive and temporarily store totes 12 with completed orders until a customer is on-site to receive the order, such as for e-commerce order in which the customer arrives in person to receive their order. The buffer may receive and temporarily store totes 12 with completed orders prior to the totes 12 and/or order items being transferred or loaded onto a delivery vehicle (e.g. a refrigerated transport vehicle), such as for last-mile delivery services, for example.

Referring now to the illustrative embodiment of FIG. 3, the method 100 is provided for controlling microclimates inside of individual storage receptacles or totes 12 within an automated warehouse system 10 having a warehouse control system 16. The method includes storing 102 goods (e.g. frozen and fresh foods) in totes 12 that are stored in an ASRS 14. The totes 12 each have an independent climate control system that is operable to monitor and regulate environmental conditions within the tote 12 and/or the ASRS 14 includes environmental control input interfaces at each storage location with the ASRS 14 to provide inputs to the totes 12 stored therein. The system 10 is operable to regulate or adjust one or more environmental conditions within the totes 12, including temperature, humidity, and/or gas levels. The warehouse control system 16 monitors 104 the environmental conditions within each tote 12, such as temperature and humidity. Each tote 12 is individually addressable via the communication network 18. If a particular one of the totes 12 requires adjustment of its environmental conditions, the warehouse control system 16 directs or controls 106 that particular tote 12 and/or the environmental control inputs at the corresponding storage location to adjust the microclimate environmental conditions to meet the requirements of the goods stored within that particular tote 12.

The method 100 may include directing 108 order fulfilment operations within the automated warehouse system 10 to hold or buffer all of the totes 12 containing goods for a particular order until an order container or containers (e.g. another microclimate-controlled tote or a shipping container) is available at an order fulfilment workstation and adequate to accommodate all of the required goods for that order (FIG. 3). Once the order container is or containers are available, the warehouse control system 16 directs 110 the ASRS 14 to release all of the totes 12 with required goods to the workstation for the order fulfilment processing. Thus, the goods are maintained at adequate or ideal environmental conditions for as long as possible while present in the automated warehouse system 10. It will be appreciated that the automated warehouse system 10 is operable to buffer items for an order and/or complete orders within the ASRS 14 for extended periods of time, such as holding some items until all other items for an order are ready/available for fulfilment. The automated warehouse system 10 may also hold completed orders in the ASRS 14 until such time as they are to be retrieved for a customer. For example, a completed order may be stored in the ASRS 14 in the morning once it has been fulfilled, and then the completed order may be retrieved from the ASRS 14 and loaded on a delivery vehicle at point later in the evening based on a customers scheduled delivery time.

The method 100 may also include directing 112 order fulfilment operations within the automated warehouse system 10 to hold one or more of the totes 12 containing goods for a particular order at a buffer until an order container is or containers are available at the order fulfilment workstation to accommodate all of the required goods for that order. Once the order container is or containers are available the warehouse control system 16 directs 114 the buffer and, if necessary, the ASRS 14, to release all of the totes 12 with required goods to the workstation for the order fulfilment processing. In the event that the microclimate-control functions of the automated warehouse system 10 were to fail or be interrupted, the totes 12 may be systematically removed from storage in a manner that prioritizes removal of the most perishable or fragile goods from the ASRS 14 first. For example, the buffer may be utilized to hold completed orders for a short period of time such that they are readily available for deliver or when a customer arrives to retrieve their order.

Thus, the automated warehouse system and method for controlling the internal microclimate of totes within the system provide for independent environmental condition monitoring and regulation for each tote. The system enables individual totes to be maintained at adequate or substantially ideal conditions, independent of its position within the storage system or relative to adjacent totes. The totes are provided with self-contained environmental control systems and the storage system may include environmental control inputs to adjust or maintain the environmental conditions within a particular tote. The system is operable to monitor and control the microclimate of a tote while it is stored at a storage location within the storage system or in a buffer, and the system may be operable to monitor and/or control the microclimates of the totes while they travel throughout the system.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An automated warehouse system for storage of goods at different temperatures and having a warehouse control system controlling said system, said system comprising:
   an automated storage and retrieval system comprising a storage rack defining a plurality of storage locations; and
   a plurality of storage receptacles configured to be stored at storage locations in said automated storage and retrieval system, wherein each of said storage receptacles is individually addressable by the warehouse control system, and wherein environmental conditions within each of said storage receptacles is regulated via the warehouse control system when said storage receptacles are stored at said storage locations;
   wherein the warehouse control system is operable to monitor, maintain and adjust the environmental conditions of each of said storage receptacles stored in said automated storage and retrieval system based on information received regarding the corresponding one of said storage receptacles, and wherein the warehouse control system is operable to separately maintain and adjust the environment conditions of each of said storage receptacles.

2. The automated warehouse system of claim 1, further comprising a communication network disposed throughout said automated storage and retrieval system and selectively engageable by one of said storage receptacles at each of said storage locations, wherein each of said storage receptacles is configured to selectively couple with said communication network when stored at one of said storage locations.

3. The automated warehouse system of claim 2, wherein the warehouse control system is operable to adjust the environmental conditions of each of said storage receptacles via a connection between said communication network and each of said storage receptacles.

4. The automated warehouse system of claim 3, wherein each said storage receptacle comprises a microclimate control system, and wherein environmental conditions within each said storage receptacle are adjusted via the respective said microclimate control system via said communication network.

5. The automated warehouse system of claim 4, wherein said automated storage and retrieval system further comprises a power interface at each said storage location configured to provide power to respective said storage receptacles stored at said storage locations.

6. The automated warehouse system of claim 2, wherein said communication network is operable to monitor and regulate environmental conditions within said storage receptacles when said storage receptacles are coupled with said communication network.

7. The automated warehouse system of claim 2, further comprising a buffer configured to store a plurality of said storage receptacles either once they have been released from said automated storage and retrieval system or after a decant operation, wherein said communication network comprises a portion disposed throughout said buffer, wherein the warehouse control system is operable to direct order fulfilment operations in a manner that holds at least some of said storage receptacles containing required goods for a particular order at said buffer until an order container or containers are available at an order fulfilment workstation to accommodate all of the required goods for that particular order.

8. The automated warehouse system of claim 1, wherein said automated storage and retrieval system further comprises a fluid distribution system disposed throughout said automated storage and retrieval system that is selectively engageable by one of said storage receptacles at each of said storage locations, wherein each of said storage receptacles is configured to selectively couple with said fluid distribution system when stored at one of said storage locations, and wherein the warehouse control system is operable to adjust the environmental conditions of each of said storage receptacles via a connection between said fluid distribution system and each of said storage receptacles.

9. The automated warehouse system of claim 8, wherein said fluid distribution system is configured to supply one of a gas or air to said storage receptacles.

10. The automated warehouse system of claim 9, wherein said fluid distribution system is configured to supply refrigerated gas or air to said storage receptacles.

11. The automated warehouse system of claim 1, wherein said automated warehouse system is located in an ambient environment.

12. The automated warehouse system of claim 1, wherein said automated storage and retrieval system comprises one chosen from a grid storage system, an aisle based storage system, and a carousel based storage system.

13. The automated warehouse system of claim 1, wherein at least one chosen from temperature, humidity, and gas levels within said storage receptacle are controllable.

14. The automated warehouse system of claim 1, wherein the warehouse control system is operable to direct decant operations of inbound goods into storage receptacles in a manner that provides a storage receptacle or receptacles for decanting having adequate storage volume available to receive an entirety of an inbound case of goods such that the entirety of the goods are stored at identical environmental conditions within the same one or ones of said storage receptacles.

15. The automated warehouse system of claim 1, wherein the warehouse control system is operable to direct order fulfilment operations of goods stored in two or more of said storage receptacles in a manner that holds all of said storage receptacles containing required goods for a particular order until an order container or containers are available at an order fulfilment workstation to accommodate all of the required goods for that particular order.

16. A method for controlling microclimates inside of individual storage receptacles within an automated warehouse system having a warehouse control system, said method comprising:
   storing a plurality of storage receptacles in an automated storage and retrieval system;
   monitoring the environmental conditions within each of the storage receptacles with the warehouse control system, which is operable to individually address each of the storage receptacles via a communication network disposed throughout the automated storage and retrieval system; and
   regulating the environmental conditions within particular ones of the storage receptacles if the storage receptacles require adjustment of their respective environmental conditions based on said monitoring to meet the requirements for the goods stored within the particular storage receptacles.

17. The method of claim 16, further comprising directing order fulfilment operations within the automated warehouse system with the warehouse control system in a manner that holds all of the storage receptacles containing required goods for a particular order until an order container or containers are available at an order fulfilment workstation to accommodate all of the required goods for that particular order, and once the order container or containers are available, directing the automated storage and retrieval system to release all of the required storage receptacles to the workstation.

18. The method of claim 16, further comprising directing order fulfilment operations within the automated warehouse system with the warehouse control system in a manner that holds at least some of the storage receptacles containing required goods for a particular order at a buffer of the automated warehouse system until an order container or containers are available at an order fulfilment workstation to accommodate all of the required goods for that particular order, and once the order container or containers are available, directing the buffer and, if necessary, the automated storage and retrieval system, to release all of the required storage receptacles to the workstation.

19. The method of claim 12, wherein each of the storage receptacles is operable to control at least one chosen from temperature, humidity, and gas levels within the storage receptacle.

* * * * *